United States Patent [19]

Pinkus et al.

[11] Patent Number: 5,371,171

[45] Date of Patent: Dec. 6, 1994

[54] POLY(METHYLENE OXALATE) AND PRECURSORS THERETO

[75] Inventors: A. G. Pinkus, Robinson; Rajan Hariharan, Waco, both of Tex.

[73] Assignee: Baylor University, Waco, Tex.

[21] Appl. No.: 27,134

[22] Filed: Mar. 5, 1993

[51] Int. Cl.$^5$ .............................................. C08G 63/02
[52] U.S. Cl. .................................. 528/271; 528/230; 528/247; 528/397; 528/422
[58] Field of Search ............... 528/271, 230, 247, 397, 528/422

[56] References Cited

U.S. PATENT DOCUMENTS 4,141,087  2/1979  Shalaby et al. .

OTHER PUBLICATIONS

Carothers et al., "Studies on Polymerization and Ring Formation, V. Glycol Esters of Oxalic Acid," *J. Am. Chem. Soc.*, 52:3292-3300, Jun. 1930, published in USA.
Carothers, Wallace H., "Linear Condensation Superpolymers Suitable for Production of Pliable, Strong, Elastic Fibers," *Chem. Abstr.*, pp. 1937-1938, published in USA, Jun. 1937.
Cimecioglu and East, "Poly(methylene Sebacate)*:Synthesis and Characterization," *J. Polym. Sci. Polym. Chem. Ed.*, 30:313-321, Jun. 1992, published in USA.
Cimecioglu et al., "The Synthesis and Characterization of Poly(methylene Terephthalate)," *J. Polym. Sci. Polym. Chem. Ed.*, 26:2129-2139, Jun. 1988, published in USA.
Coquard et al., "Bioresorbable Surgical Product," *Chem. Abstr.*, vol. 84, Abstract No. 84:111702j, Jun. 1976, published in USA.
East and Morshed, "The Preparation of Poly(methylene esters)," *Polymer*, 23:1555-1557, Jun. 1982, published in United Kingdom.
East and Morshed, "High Molecular Weight Polyesters form Alkali Metal Dicarboxylates and $\alpha$, $\omega$-Dibromo Compounds," *Polymer*, 23:168-170, Jun. 1982, published in United Kingdom.
Shelley, Suzanne, "Wanted: The Perfect Asbestos Substitute," *Chemical Engineering*, pp. 59 & 61, Jun. 1993, published in USA.
Kvick and Liminga, "Structure of Methylene Oxalate," *Acta Cryst.*, B36:734-736, Jun. 1980, published in Europe.
Dialog Search Report, Jun. 1992, printed in USA.

*Primary Examiner*—John Kight, III
*Assistant Examiner*—Shelley A. Dodson
*Attorney, Agent, or Firm*—Arnold, White & Durkee

[57] ABSTRACT

A poly(methylene oxalate) polymer [poly(oxy(1,2-dioxo-1,2-ethanediyl)oxymethylene)], a bis(tetrabutylammonium) oxalate salt, methods of synthesis thereof and methods of use. Poly(methylene oxalate) is insoluble in all common organic solvents, does not melt and is resistant to fire. Applications are as a light-weight material for use at high temperatures, e.g. as a structural material in aircraft and space vehicles, as a binder for brake systems, and as an insulator for microelectronic components.

4 Claims, 4 Drawing Sheets

POLY(METHYLENE OXALATE) AND PRECURSORS THERETO

BACKGROUND OF THE INVENTION

Polyoxalates have been previously prepared by ester interchange with diols such as ethylene glycol, 1,3-propanediol, or 1,4-butanediol with diethyloxalate [Carothers et al., *J. Am. Chem. Soc.*, 52, 3292 (1930); Gordon et al., *Polym. Prepr. (Am. Chem. Soc., Div. Polym. Chem.)*31, 507 (1990); Thibeault et al., *J. Polym. Sci.*, Pt. A: Polym. Chem., 28, 1361 (1990); Shalaby et al., U.S. Pat. No. 4,141,087 (1979)], by reactions of oxalic acid with alkylene glycols [Ellis, U.S. Pat. No. 2,111,762 (1938)], and by condensations of diols with oxaloyl chloride [Piraner et al., *Makromol. Chem.*, 193, 681 (1992)]. Linear polyesters have also been prepared by reactions of dicarboxylic acids and diols [Carothers, U.S. Pat. No. 2,071,250 and 2,071,251].

Poly(methylene sebacate) was synthesized via a reaction of cesium sebacate with bromochloromethane (Cimecioglu et al., *Journal of Polymer Science: Part A: Polymer Chemistry*, 30:313–321 (1992)), similarly, poly(methylene terephthalate) was synthesized via a reaction of cesium or potassium terephthalate with dibromomethane or bromochloromethane (Cimecioglu et al., *Journal of Polymer Science: Part A: Polymer Chemistry* 26:2129–2139 (1988)). East and Morshed (Polymer, (1982) vol. 23:168–170 and 1555–1557) have accomplished the synthesis of poly(methylene esters).

Ever since health concerns about asbestos began to surface, producers have been driven to develop suitable alternatives. Traditionally, asbestos has been woven into cloths and garments, compressed into boards, gaskets, and pipe coverings, and used as a filler and reinforcement in paint, asphalt, cement and plastic. To date, no single product has emerged that is as inexpensive, inert, strong or incombustible as asbestos.

The poly(methylene oxalate) (PMO) {systematic name: poly[oxy(1,2-dioxo-1,2-ethanediyl) oxymethylene]}, of the present invention cannot be prepared by any of the methods described above because the glycol that would be needed ($HOCH_2OH$) is not stable under normal conditions but decomposes into formaldehyde and water.

The present invention provides a synthesis of poly(methylene oxalate) which is a new composition of matter having unusual properties useful, for example, in the formulation of objects which are non-flammable and resistant to high temperatures and action of organic solvents.

SUMMARY OF THE INVENTION

The present invention provides for a poly(methylene oxalate) polymer having the structure

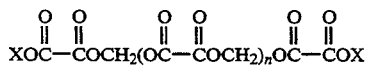

where X may be a covalently bound alkyl or hydrogen or is a positive counterion associated with an ionized terminal carboxyl group. X may be, in particular, a tetrabutylammonium ion, a quaternary ammonium cation, a tetraalkylammonium cation, a metal cation, hydrogen, or an alkyl in ester linkage to a terminal carboxyl group. Other end groups attachable to poly(methylene oxalate) matrix are also considered part of the present invention and may be prepared by routine derivatization and/or exchange methods well known to those of skill in the art.

A precursor molecule to the poly(methylene oxalate) polymer is also an aspect of the present invention and has the structure

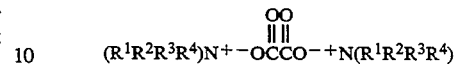

where $R^1$, $R^2$, $R^3$ and $R^4$ are butyl or $R^1$, $R^2$ and $R^3$ are methyl and $R^4$ is benzyl or an alkyl larger than butyl, for example, hexadecyl.

A further aspect of the present invention is a method for preparing poly(methylene oxalate). The method comprises reacting bis($R^1R^2R^3R^4$ ammonium) oxalate with methylene chloride, methylene bromide or methylene iodide in a mutual solvent to form a poly(methylene oxalate) precipitate. $R^1$, $R^2$, $R^3$ and $R^4$ may be alkyl or arylalkyl, such as benzyl, for example. They are not all methyl or not all ethyl. The method may further include the steps of collecting the precipitate and removing unreacted reagents. In this method for preparing poly(methylene oxalate) $R^1$, $R^2$, $R^3$ and $R^4$ is butyl or $R^1$, $R^2$ and $R^3$ are methyl and $R^4$ is benzyl or hexadecyl.

A preferred embodiment of the present invention is a method for preparing poly(methylene oxalate) comprising the steps of forming a bis(tetraalkylammonium) oxalate salt and reacting this salt with methylene chloride, methylene bromide bromochloromethane or methylene iodide to form poly(methylene oxalate). The bis(tetraalkylammonium) oxalate salt may be a bis(tetrabutylammonium) oxalate salt.

A further embodiment of the present invention is an asbestos substitute comprising fibrous poly(methylene oxalate). Such fibrous material may be made, for example, by sintering the poly(methylene oxalate).

DESCRIPTION OF THE PREFERRED EMBODIMENTS

Poly(methylene oxalate) {systematic name: poly[oxy(1,2-dioxo-1,2-ethanediyl) oxymethylene]} has been synthesized. This polymer has unique properties which make it suitable for various applications. It is insoluble in all tested common organic solvents, does not melt, nonflammable, and is resistant to fire. The proof of structure of the material is from its infrared spectrum which shows carbonyl, carbon-oxygen single bond, and carbon-hydrogen stretching bands in predicted positions (see FIG. 1).

Possible applications are as a light-weight material for use at high temperatures (for example, as a structural material in aircraft and space vehicles, as a binder for brake systems, and an insulator for microelectronic components); as a material for incorporation into objects to enhance their fire-resistance (for example, into plastics used for making furniture); as an asbestos substitute and as a material from which to make objects which will not dissolve in various solvents (for industrial uses). It may also be used as a heat-resistant coating for nose cones employed for space reentry vehicles.

Under a nitrogen atmosphere, poly(methylene oxalate) (PMO) does not begin to decompose until the temperature reaches about 430° C. On heating with a Bunsen burner flame, it sinters but does not burn. This sintering or fusing together at high temperatures forms PMO fibers useful in the aforedescribed applications.

PMO hydrolyzes slowly on stirring with sodium hydroxide solution for a period of several hours. For example, by placing PMO overnight in about 15% NaOH, it will go into solution. Poly(methylene oxalate) is also unusual in that it contains a very high percentage of oxygen (nearly 63%) and yet is very stable.

The overall synthesis of PMO consists of several steps:
(1) conversion of oxalic acid into a bis(tetraalkylammonium) salt;
(2) removal of water and solvent;
(3) reaction of the salt with a methylene halide dissolved in appropriate solvents; and
(4) separation of byproduct tetra-alkylammonium halide from the polymer.

Thus, oxalic acid is reacted with two equivalents of a tetra-alkylammonium hydroxide to form the salt in solution and the solvent and water are removed to form the anhydrous oxalate salt:

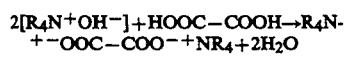

The anhydrous salt is then heated in a solvent with the methylene halide:

The precipitated polymer is separated from the solvent, for example, by centrifugation or filtration and residual tetraalkylammonium halide is separated from poly(methylene oxalate) by washing the precipitate with methanol. The tetra-alkylammonium halide is recovered by removal of solvents.

Preparation of Bis(tetrabutylammonium) Oxalate

Figure 2:
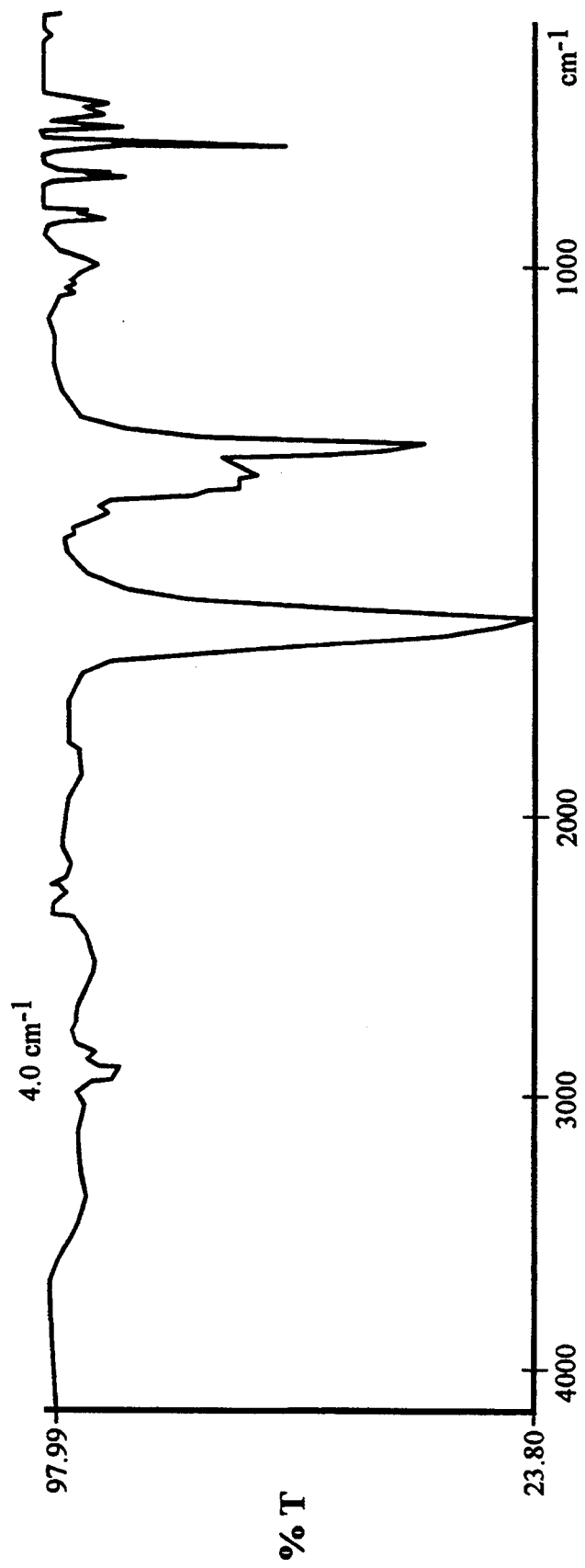
FIG. 2 shows the infrared spectrum of bis(tetrabutylammonium) oxalate obtained in $CDCl_3$ using NaCl salt plate: cm-1%; 2932.2 87.84, 1641.0 23.72, 1325.3 40.53, 914.7 88.54, 833.9 83.00, 779.4 58.85, 744.8 87.65.
Figure 3:
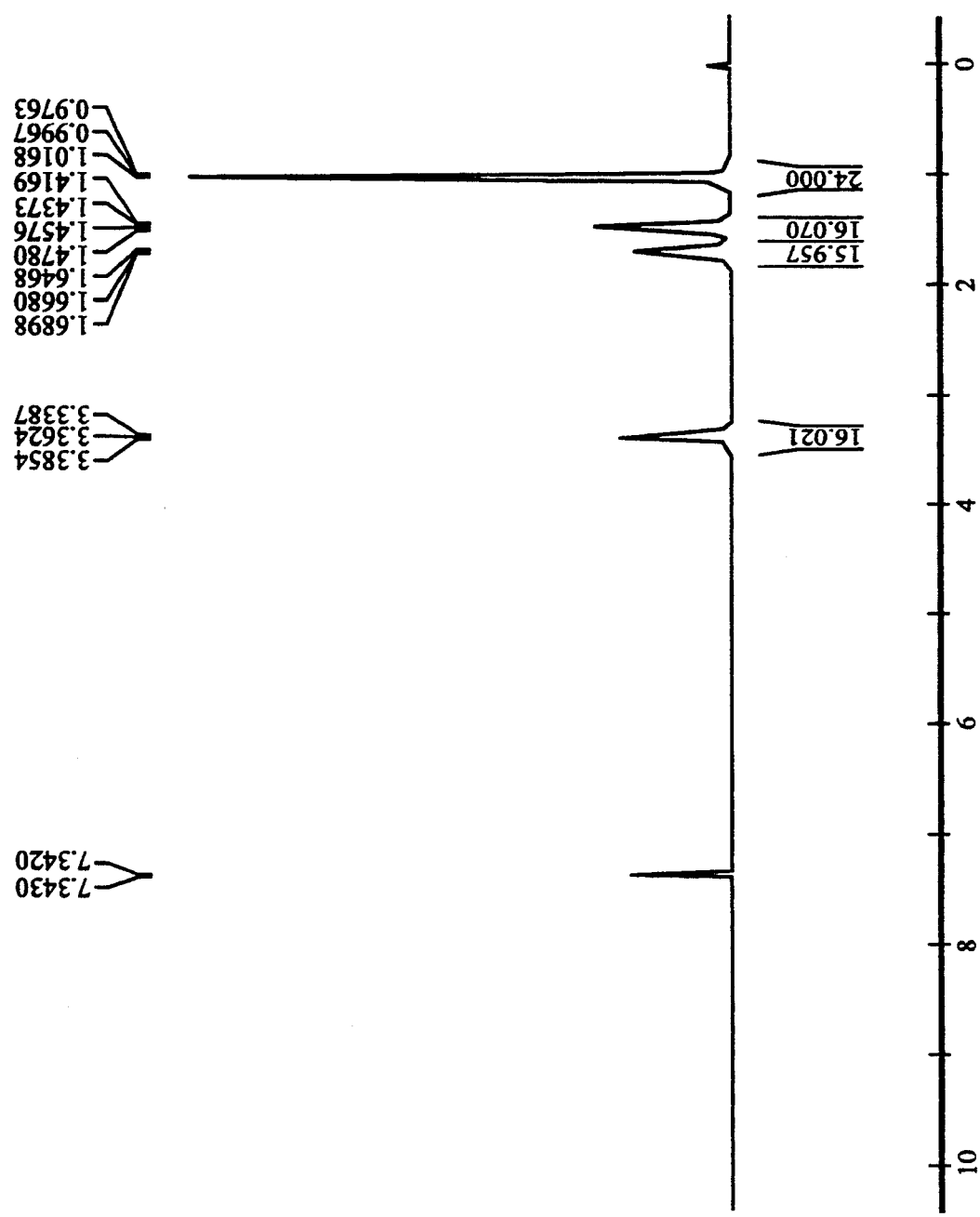
FIG. 3 shows the $^1H$ NMR spectrum of bis(tetrabutylammonium) oxalate in $CDCl_3$.
Figure 4:
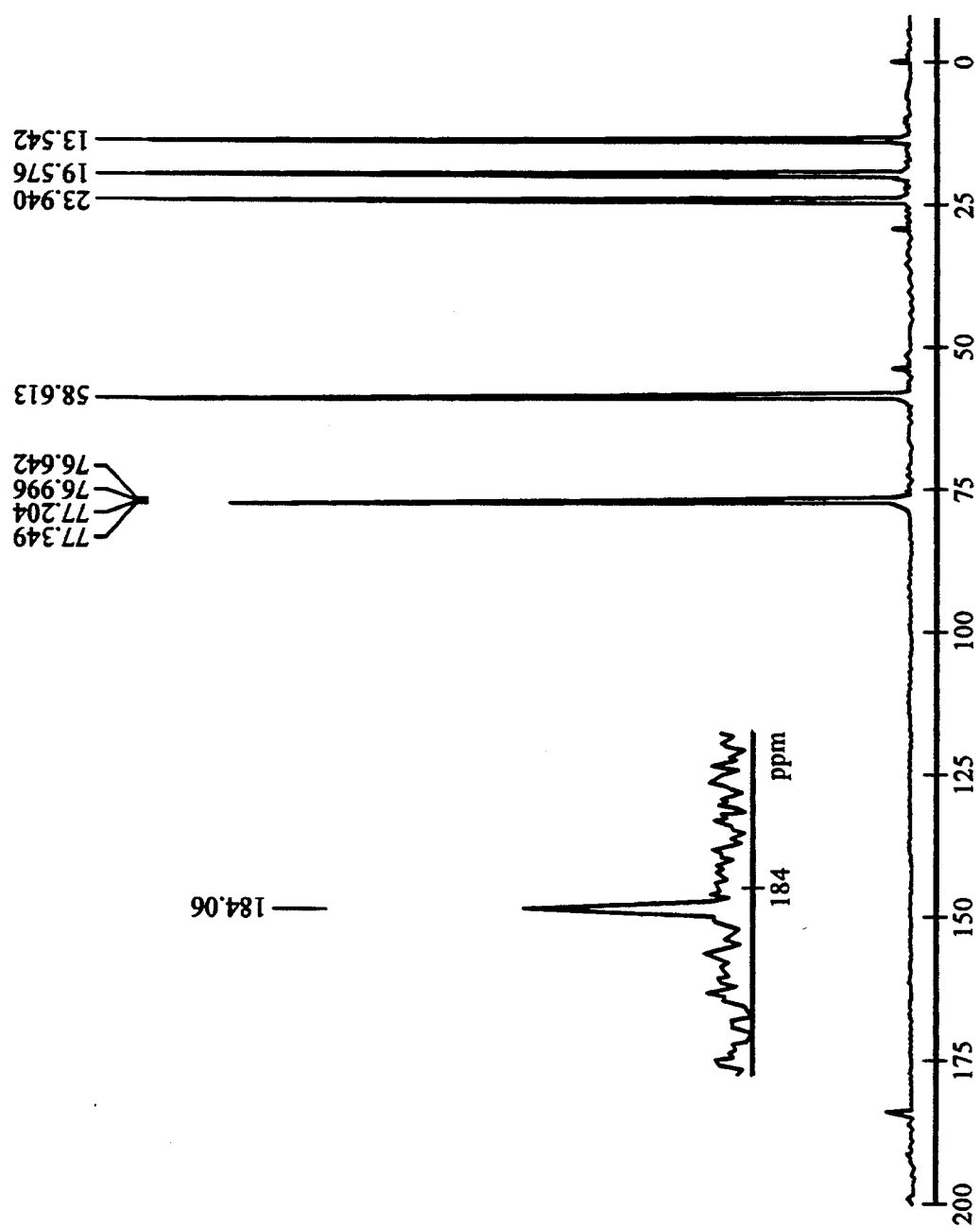
FIG. 4 shows the $^{13}C$ NMR spectrum of bis(tetrabutylammonium) oxalate in $CDCl_3$.

Tetrabutylammonium hydroxide in methanol (90 mL of a 1 molar solution, 0.098 mol) was added dropwise to 3.5 g (0.039 mol) of anhydrous oxalic acid under an argon atmosphere. The end-point was determined by titration. The solvent was removed in vacuo and the residue was dried in vacuo at 40° C. for 4 h and then at 60° C. for 9.5 h. A yield of 21 g of product was obtained. The product was characterized as bis(tetrabutylammonium) oxalate by means of its $^1$H and $^{13}$C NMR and IR spectra (FIGS. 2-4). Manipulations with bis(tetrabutylammonium) oxalate were carried out in a dry glove-box in inert atmospheres (nitrogen or argon) since the compound is very hygroscopic. Bis(tetrabutylammonium) oxalate is a new composition of matter as well as are most of the other bis(tetraalkylammonium) oxalates, an exception being tetraethylammonium oxalate. Other tetraalkylammonium oxalates may be analogously used in place of tetrabutylammonium oxalate to prepare PMO. Such compounds may also be used as substrates or inhibitors of oxalate metabolizing enzymes.

Figure 1:
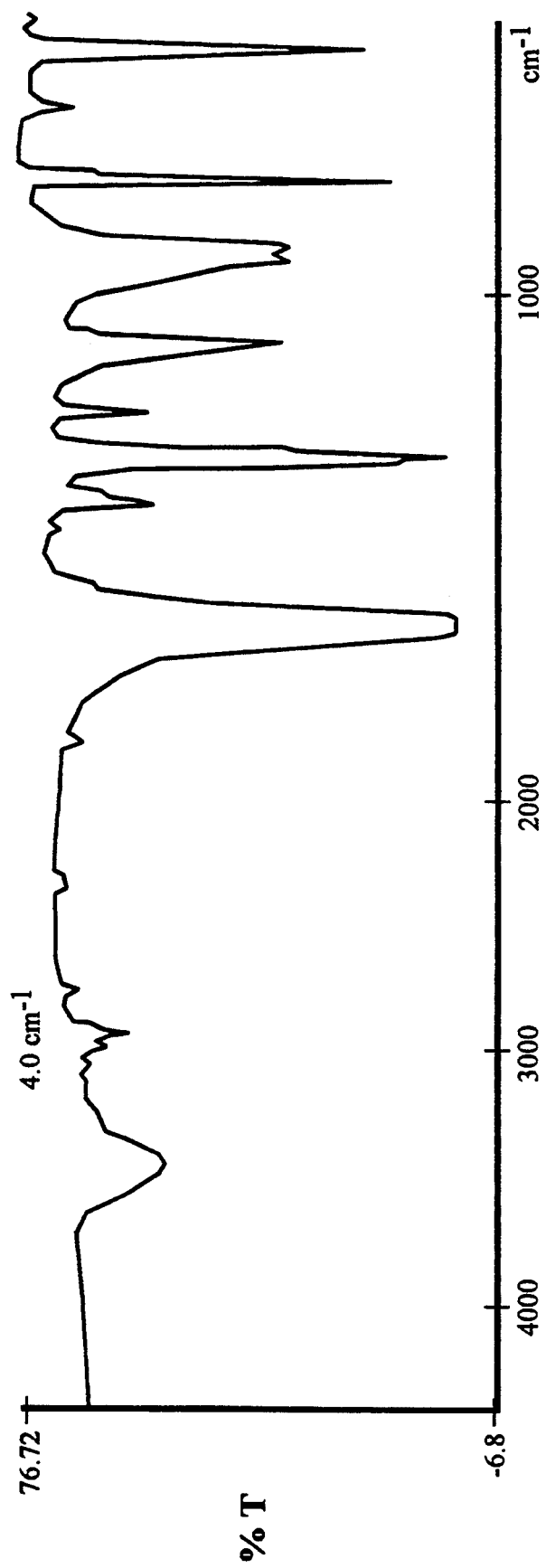
FIG. 1 shows the infrared spectrum of poly(methylene oxalate) using KBr pressed pellet: $cm^{-1}$ %; 2981 62.11, 2922 58.26, 1657 00.33, 1325 2.01, 1098 33.50, 934.5 28.61.

Preparation of Poly(methylene oxalate) (PMO) From Methylene Bromide or Methylene Chloride Bis(tetrabutylammonium) oxalate (12 g; 0.021 mol) was dissolved in 25 mL of chlorobenzene and methylene bromide (2.6 mL; 4.0 g; 0.023 mol) was added. Other solvents such as nitrobenzene, bromobenzene, and N-methylpyrrolidone, for example, may be used in place of chlorobenzene. The solution was heated at reflux for about 6.3 h and allowed to cool to room temperature. A white precipitate formed and was isolated by centrifugation. It was then washed three times with 50 mL portions of methanol to remove tetrabutylammonium bromide and unreacted starting materials, and dried in vacuo for about 2 days. The poly(methylene oxalate) product weighed 0.29 g. PMO is not soluble in any of the common organic solvents, however, it dissolved in concentrated sulfuric acid A $^{13}$C NMR spectrum of the acid solution showed carbonyl and methylene carbon signals at lower and higher field positions, respectively. The polymer did not reprecipitate when the sulfuric acid solution was poured into cold water. An infrared spectrum with a sample of the polymer in a pressed KBr pellet showed absorption peaks for C—H, C=O, and C—O stretching and C—H bending vibrations (FIG. 1). In a differential scanning calorimeter (DSC), PMO did not melt on heating to about 410° C., at which temperature it began to decompose.

Byproduct tetrabutylammonium bromide (12 g) was recovered from the above filtrate (from PMO) by evaporation of chlorobenzene and methanol solvents. A $^1$H NMR spectrum on the compound in CDCl$_3$ showed the expected four groups of peaks for the butyl group. Tetrabutylammonium bromide can be recycled back into tetrabutylammonium hydroxide by passage through an anionic exchange column to exchange hydroxide for the bromide ion or directly into bis(tetrabutylammonium) oxalate.

Other tetraalkylammonium hydroxides (R$_4$N$^+$OH$^-$ and R$^1$R$^2$R$^3$R$^4$N$^+$ OH$^-$) can be used to prepare the bis(tetraalkylammonium) oxalates. However, bis(tetramethylammonium) oxalate appears to be too insoluble and bis(tetraethylammonium) oxalate forms a very dark-colored mixture. Arylalkyltrimethylammonium compounds (such as benzyltrimethylammonium and hexadecyltrimethylammonium) can also be used.

The synthesis procedure using methylene chloride was similar to that described above with methylene bromide using 8.8 g (0.015 mol) of bis(tetrabutylammonium) oxalate, 25 mL chlorobenzene solvent, and 1.1 mL (1.5 g, 0.017 mol) of methylene chloride. The solution was heated at 85° C. (external oil bath temperature) for 4 days, during which time a white precipitate had formed. The weight of polymer isolated by the same procedure described above was 0.22 g.

On evaporation of the solvents from the filtrate and drying of the residue in vacuo, 8.9 g. of tetrabutylammonium chloride was isolated and characterized by its $^1$H NMR spectrum. Tetrabutylammonium chloride can also be recycled. Bromochloromethane or methylene iodide may be used as the methylene halide in addition to methylene bromide or methylene chloride.

Other methods of synthesis of PMO were tried, for example, when the present inventors tried to synthesize PMO by reacting oxalic acid and methylene bromide (or methylene chloride) with triethylamine, a method analogous to that which was successful in the synthesis of polyglycolide [A. G. Pinkus and R. Subramanyam, J. Polym. Sci., Polym. Chem. Ed., 22, 1131 (1984)], polymandelide [A. G. Pinkus, R. Subramanyam, S. L. Clough, and T. C. Lairmore., J. Polym. Sci. Part A. Polym. Chem., 27, 4291 (1989)], and polyhydroxymethylbenzoates [A. G. Pinkus, R. Subramanyam, and R. Hariharan, J. Macromol. Sci.- Pure Appl. Chem., A29, 1031 (1992)], the reaction did not take place.

Preparation of Poly(alkylene dicarboxylates)

Based on the synthesis of poly(methylene oxalate), dicarboxylic acids (such as terephthalic, isophthalic, dimethylmalonic, malonic, succinic, adipic, fumaric, etc.) are first converted into the corresponding bis(tetraalkylammonium) dicarboxylates by reaction of the dicarboxylic acid $HO_2CRCO_2H$ (where R is an aliphatic or aromatic moiety) with two equivalents of tetraalkylammonium hydroxide:

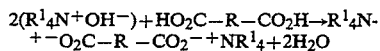

The bis(tetraalkylammonium) dicarboxylate is then reacted with an alkylene dihalide such as alkylene bromide or alkylene chloride to form the poly(alkylene dicarboxylate) as described for poly(methylene oxalate):

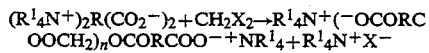

$X = Cl$ or $Br$ or $I$

Copolymers of poly(alkylene dicarboxylates) may be obtained by reacting the bis(tetraalkylammonium) dicarboxylate salt with a mixture of alkylene halides such as methylene or ethylene halide. The properties of the copolymers can be varied by changing the ratio of alkylene halides in the mixture. Similarly, a mixture of dicarboxylate salts my yield copolymers with desired properties.

The pertinent parts of the following references are incorporated by reference herein.

REFERENCES

Carothers et al., J. Am. Chem. Soc., 52, 3292 (1930).
Carothers, U.S. Pat. No. 2,071,251.
Carothers, U.S. Pat. No. 2,071,250.
Cimecioglu et al., Journal of Polymer Science: Part A: Polymer Chemistry, 26:2129-2139 (1988)
Cimecioglu et al., Journal of Polymer Science: Part A: Polymer Chemistry, 30:313-321 (1992)
East and Morshed, Polymer, 23:168-170 and 1555-1557 (1982).
Ellis, U.S. Pat. No. 2,111,762 (1938).
Gordon et al., Polym. Prepr. Am. Chem. Soc., Div. Polym. Chem., 31, 507 (1990)
Pinkus et al., J. Polym. Sci., Polym. Chem. Ed., 22, 1131 (1984).
Pinkus et al., J. Polym. Sci. Part A. Polym. Chem., 27, 4291 (1989).
Pinkus et al., J. Macromol. Sci.- Pure Appl. Chem., A29, 1031 (1992).
Piraner et al., Makromol. Chem., 193, 681 (1992).
Shalaby et al., U.S. Pat. No. 4,141,087 (1979).
Thibeault et al., J. Polym. Sci., Pt. A: Polym. Chem., 28, 1361 (1990).

What is claimed is:

1. A polymer produced by reacting a bis($R^1R^2R^3R^4$ ammonium) oxalate with methylene chloride or methylene bromide, wherein $R^1$, $R^2$, $R^3$ and $R^4$ are butyl or $R^1$, $R^2$ and $R^3$ are methyl and $R^4$ is benzyl or hexadecyl.

2. The polymer of claim 1 where the reacting is in a mutual solvent for bis($R^1R^2R^3R^4$ ammonium) oxalate and methylene chloride or methylene bromide.

3. The polymer of claim 2 where the polymer is collected as a precipitate from the solvent and unreacted reagents removed.

4. The polymer of claim 1 where methylene bromide is used and $R^1$, $R^2$, $R^3$ and $R^4$ are butyl.

* * * * *